United States Patent
Watanabe et al.

(10) Patent No.: US 8,363,364 B2
(45) Date of Patent: Jan. 29, 2013

(54) POWER FEED CONTROL DEVICE

(75) Inventors: Hirotoshi Watanabe, Tsu (JP); Tatsuya Mukai, Tsu (JP); Shiro Mori, Tsu (JP); Naoki Fukuo, Tsu (JP); Kiyosi Gotou, Amagasaki (JP); Kouji Kakiuchi, Tsu (JP); Shinichi Nakamura, Tsu (JP)

(73) Assignee: Panasonic Corporation, Osaka (JP)

( * ) Notice: Subject to any disclaimer, the term of this patent is extended or adjusted under 35 U.S.C. 154(b) by 219 days.

(21) Appl. No.: 12/948,876

(22) Filed: Nov. 18, 2010

(65) Prior Publication Data

US 2011/0122536 A1    May 26, 2011

(30) Foreign Application Priority Data

Nov. 20, 2009    (JP) .................................. 2009-265159

(51) Int. Cl.
*H02H 3/00* (2006.01)

(52) U.S. Cl. ........................................... 361/46; 361/42

(58) Field of Classification Search .............. 361/42–50
See application file for complete search history.

(56) References Cited

U.S. PATENT DOCUMENTS 5,978,191 A * 11/1999 Bonniau et al. ................. 361/45
2005/0275995 A1 * 12/2005 Noguchi et al. ............... 361/160

FOREIGN PATENT DOCUMENTS

JP    2009-234392 A    10/2009

* cited by examiner

*Primary Examiner* — Danny Nguyen
(74) *Attorney, Agent, or Firm* — Cheng Law Group, PLLC

(57) ABSTRACT

A branch wire L5 from the voltage detection circuit 14 is inserted in the zero-phase-sequence current transformer ZCT in the direction from the load side to the external power supply side. For this configuration, the zero-phase-sequence current transformer ZCT is to detect unbalance of the sum of current flowing in the first and second conductive wires L1, L2 and the current flowing in the branch wire L5. Therefore, the present invention can accurately detect occurrence of electrical leakage.

8 Claims, 3 Drawing Sheets

POWER FEED CONTROL DEVICE

TECHNICAL FIELD

The invention relates to a power feed control device.

BACKGROUND ART

In the past, there has been provided a power feed control device A as shown in FIG. 3A. For example, the power feed control device A (for example, refer to Japanese Patent Application Laid-Open No. 2009-234392) includes a plug 20 being configured to be attached to an external power supply such as a commercial AC power supply of 100V, a load connector 21 being configured to be attached to a load such as a vehicle, and a feed line. The feed line includes a first conductive wire L1 corresponding to a live wire and a second conductive wire L2 corresponding to a neutral wire. The power feed control device A is used, for example, for supplying an on-vehicle charger with electric power. The on-vehicle charger is configured, for example, to charge up a battery which a plug-in hybrid vehicle or an electric vehicle is equipped with.

For details, the power feed control device A includes the first conductive wire L1 and the second conductive wire L2 for supplying power from a power supply to a load, and a third conductive wire L3 corresponding to a ground wire. The third conductive wire L3 is connected with a ground terminal of the plug 20. A relay (switching device) 10, including contact points rp1, rp2 and contact open/close parts rs1, rs2, is inserted in the first and second conductive wires L1, L2. In addition, the power feed control device A includes a fourth conductive wire L4 and a control circuit 12. The fourth conductive wire L4 is provided separately from the conductive wires L1 to L3. The fourth conductive wire L4 is configured to transmit a signal to and from the load. The control circuit 12 is configured to be connected with the load through the fourth conductive wire L4. The control circuit 12 is configured to control to turn on and off the relay 10 according to a control signal supplied from the load through the fourth conductive wire L4. In addition, the power feed control device A includes a zero-phase-sequence current transformer ZCT and a leakage detection circuit 13. The zero-phase-sequence current transformer ZCT is arranged between the relay 10 and the plug 20, and is passed through by each of the first and second conductive wires L1, L2. The leakage detection circuit 13 is configured to detect occurrence of electrical leakage by detecting an unbalanced current flowing in the feed line (the first conductive wire L1 and the second conductive wire L2) via the zero-phase-sequence current transformer ZCT. If unbalance occurs in currents flowing in the feed line (the first conductive wire L1 and the second conductive wire L2), the zero-phase-sequence current transformer ZCT generates an induced current according to the unbalanced current. The leakage detection circuit 13 is configured to detect occurrence of electrical leakage based on the induced current. That is, the leakage detection circuit 13 is configured to detect occurrence of electrical leakage based on the unbalanced current flowing through the zero-phase-sequence current transformer ZCT. The control circuit 12 is configured to control to turn off the relay 10 when the occurrence of electrical leakage is detected through the leakage detection circuit 13.

In addition, this conventional example includes a voltage detection circuit 14 and a branch wire L5, and is configured to be able to detect occurrence of a contact welding in the relay 10. The voltage detection circuit 14 is connected with each of the first and second conductive wires L1, L2 between the relay 10 and the load connector 21. The voltage detection circuit 14 is configured to detect voltage of each of the first and second conductive wires L1, L2 between the relay 10 and the load connector 21. The branch wire L5 is a conductive wire, and branches from the voltage detection circuit 14. One end of the branch wire L5 is configured to be grounded (for example, connected with the third conductive wire L3). As shown in FIG. 3B, the voltage detection circuit 14 is configured to detect whether or not voltage is applied to the first conductive wire L1 and the second conductive wire L2, respectively. That is, the comparator CP1 of the voltage detection circuit 14 compares a threshold voltage $V_{th}$ with voltage of the first conductive wire L1 (or the second conductive wire L2) after being smoothed by a condenser C1 and a resistor R1 and being peak held by a diode D1, a condenser C2, a zener diode Z1 and a resistor R2. In this conventional example, when the control circuit 12 controls to turn off the relay 10, if a contact welding is not occurred in the relay 10, the contact open/close parts rs1, rs2 separates from the contact points rp1, rp2, respectively. Then, each of the first and second conductive wires L1, L2 is broken. In this case, current does not flow into the branch wire L5. And the voltage detection circuit 14 does not detect voltage. On the other hand, if one of the contact points rp1, rp2 and one of the contact open/close parts rs1, rs2 are welded, even if the control circuit 12 tries to control to turn off the relay 10, one of the contact open/close parts rs1, rs2 cannot separate from the corresponding contact points rp1, rp2. In this case, current flows from the power supply to ground through the welded contact open/close part rs1 or rs2 and though the branch wire L5. Then, the voltage detection circuit 14 detects voltage. If detecting the above contradiction, that is, if voltage is detected through the voltage detection circuit 14 when the relay 10 is controlled to turn off, the control circuit 12 decides that a contact welding occurs in the relay 10.

This conventional example also includes a power supply circuit (not shown in figure). The power supply circuit is connected with each of the first and second conductive wires L1, L2 between the relay 10 and the plug 20, and connected with the third conductive wire L3. The power supply circuit is configured to supply the control circuit 12, the leakage detection circuit 13 and the voltage detection circuit 14 with electric power.

As described above, in this conventional example, the branch wire L5 branches from the voltage detection circuit 14, and one end of the branch wire L5 is configured to be grounded. Then, this conventional example is configured to be able to detect a welding of the contact points rp1 and rp2, by detecting the current flowing to the branch wire L5. For this reason, this conventional example can prevent troubles such as electric shock.

In this conventional example, when a current flows in the first and second conductive wires L1, L2, a current always flows in the branch wire L5, too. That is, a part of the current flowing in the first or second conductive wire L1, L2 from a power supply side to a load side is to flow into the branch wire L5. In addition, a part of the current flowing in the first or second conductive wire L1, L2 from a load side to a power supply side is to flow into the branch wire L5. Considering the magnitude of electric current flowing in the first and second conductive wires L1, L2 where the zero-phase-sequence current transformer ZCT is arranged, the magnitude of the current I1 flowing from the power supply to the load is always larger than the magnitude of the current I2 flowing from the load to the power supply by the magnitude of the current I3 flowing in the branch wire L5 toward ground. That is, the magnitude of the current flowing in the first conductive wire L1 is different from the magnitude of the current flowing in the second conductive wire L2 by the magnitude of the current flowing in the branch wire L5. Therefore, a small unbalanced current always flows through the zero-phase-sequence current transformer ZCT. Here, it should be noted that each of the current flowing in the first and second conductive wires L1, L2 is alternating current. Therefore, the direction of the current flowing in the first conductive wire L1 and the direction of the current flowing in the second conductive wire L2 alternately vary with time. In addition, the relation, which magnitude of the current is larger, flowing in the first conductive wire L1 or flowing in the second conductive wire L2, varies with time. However, the magnitude of the current I1 flowing from the power supply to the load is always larger than the magnitude of the current I2 flowing from the load to the power supply.

In this conventional example, in order to prevent the leakage detection circuit 13 from faultily deciding the difference between the magnitude of the current I1 and the magnitude of the current I2 as an electrical leakage, the leakage detection circuit 13 needs to be set so that it does not decide an occurrence of electrical leakage even if a small unbalanced current is detected through the zero-phase-sequence current transformer ZCT. Therefore, this conventional example cannot detect such an electrical leakage whose magnitude is less or comparable with the magnitude of the current I3. That is, this conventional example cannot accurately detect occurrence of electrical leakage.

DISCLOSURE OF THE INVENTION

It is an object of the present invention to provide a power feed control device which includes a voltage detection circuit and is configured to be able to accurately detect occurrence of electrical leakage.

In order to achieve the above object, the power feed control device of the present invention comprises: a feed line connected between an external power supply and a load; a switching device inserted in the feed line, said switching device being configured to make and break the feed line; a zero-phase-sequence current transformer through which the feed line is passed, said zero-phase-sequence current transformer being configured to detect an unbalanced current in the feed line; and a voltage detection circuit connected with the feed line between the load and a combination of the switching device and the zero-phase-sequence current transformer, said voltage detection circuit being configured to detect voltage of the feed line. A branch line from the voltage detection circuit is inserted in the zero-phase-sequence current transformer in the direction from the load side to the external power supply side.

In the above configuration, the branch line from the voltage detection circuit passes through the zero-phase-sequence current transformer. For this reason, the zero-phase-sequence current transformer is to detect unbalance of the sum of current flowing in the feed line and current flowing in the branch line. Therefore, occurrence of electrical leakage can be detected accurately.

In an embodiment, the feed line is configured to be used for charging a battery using the external power supply, said battery being mounted on a vehicle as the load. The power feed control device further comprises: a control circuit electrically connected with a signal line for transmitting a control signal supplied from the vehicle, said control circuit being configured to control to turn on and off the switching device based on the control signal; and a leakage detection circuit configured to detect electrical leakage based on an unbalanced current detected through the zero-phase-sequence current transformer, said leakage detection circuit being configured to control the switching device to break the feed line when the electrical leakage is detected. One end of the branch line is grounded. The voltage detection circuit is configured to detect the voltage of the feed line between the switching device and the vehicle based on a current flowing in the voltage detection circuit. The control circuit is configured, when detecting a contradiction between a detection result of the voltage detection circuit and a control condition of the switching device, to decide that a contact welding occurs. The branch line passes through the zero-phase-sequence current transformer in the direction so that current flows in it in the same direction as the current flowing in the feed line from the vehicle to the external power supply.

According to the above configuration, the voltage detection circuit is configured to detect voltage of the feed line between the switching device and the vehicle based on a current flowing into the branch line. The control circuit is configured to, compare the detection result of the voltage detection circuit with the control condition of the switching device. In such a configuration, occurrence of a contact welding of the switching device can be detected.

In an embodiment, the power feed control device further comprises: a power connector comprising a ground terminal, said power connector being configured to be detachably attached to the external power supply; and a load connector configured to be detachably attached to a connector which the load is equipped with. Said feed line comprises first and second conductive wires arranged between the power connector and the load connector, said first and second conductive wires being configured to be connected with a live wire and a neutral wire of the external power supply when the power connector is connected with the external power supply, respectively. The power feed control device further comprises a third conductive wire arranged between the ground terminal of the power connector and the load connector, said third conductive wire being configured to be connected with a ground wire of the external power supply when the power connector is connected with the external power supply. The branch line is connected with the third conductive wire.

In an embodiment, the power feed control device further comprises a leakage detection circuit connected with the zero-phase-sequence current transformer, said leakage detection circuit being configured to decide that electrical leakage occurs when the magnitude of the unbalanced current is larger than a predetermined value.

In an embodiment, the power feed control device further comprises a control circuit connected with the switching device and the leakage detection circuit, said control circuit being configured to control the switching device to make and break the feed line. The control circuit is configured to control the switching device to break the feed line when the occurrence of electrical leakage is detected through the leakage detection circuit.

In an embodiment, the power feed control device further comprises a fourth conductive wire connected with the control circuit, said forth conductive wire being configured to be connected with a signal wire which the load is equipped with. The control circuit is configured to send an error signal to the load through the fourth conductive wire when the occurrence of electrical leakage is detected through the leakage detection circuit.

In an embodiment, the power feed control device further comprises: a control circuit connected with the switching device and the voltage detection circuit, said control circuit being configured to control the switching device to make and break the feed line; and a fourth conductive wire connected with the control circuit, said forth conductive wire being configured to be connected with a signal wire which the load is equipped with. The control circuit is configured to send an error signal to the load through the fourth conductive wire if the voltage is detected through the voltage detection circuit when the control circuit tries to control the switching device to break the feed line.

The present invention can provide a power feed control device which includes a voltage detection circuit and is configured to be able to accurately detect occurrence of electrical leakage.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
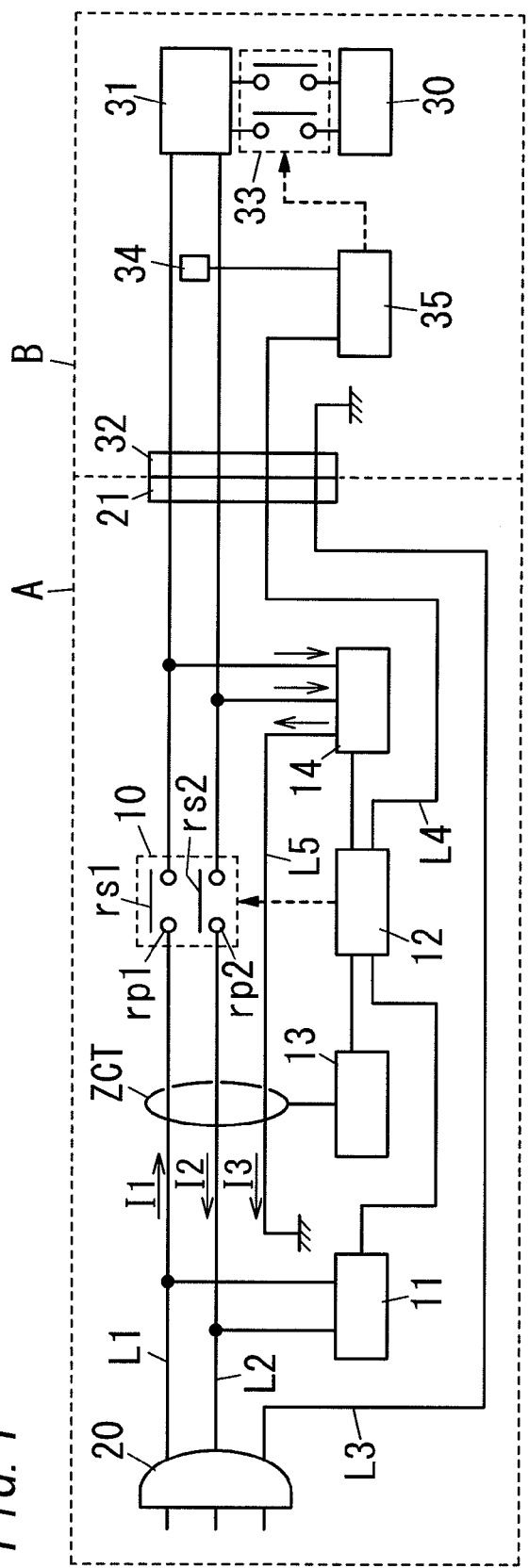
FIG. 1 is a circuit block diagram of an embodiment of the present invention.

An embodiment of the present invention is explained with reference to attached drawings. In FIG. 1, each solid arrows shows the flowing direction of current. It should be noted that each of the current flowing in the first conductive wire L1 and the second conductive wire L2 is alternating current. Therefore, the flowing directions of the currents alternately vary with time.

A power feed control device like the present embodiment can be used for such as a plug-in hybrid vehicle or an electric vehicle. An electric vehicle is used for explaining the operation of the present embodiment.

An electric vehicle B includes a battery 30, an on-vehicle charger 31, a connector 32, a relay 33, a detection part 34 and a charge control device 35. The battery 30 is configured to supply a motor (not shown in figure), which is a drive source of the electric vehicle B, with electric power. The on-vehicle charger 31 is configured to convert AC power supplied from a commercial power supply (not shown in figure), which is an external power supply, into DC power to charge the battery 30. The AC power is supplied from the commercial power supply through a power feed control device A. The connector 32 is configured to be used for connecting the on-vehicle charger 31 with the power feed control device A. The relay 33 is inserted in a charging line for connecting the on-vehicle charger 31 with the battery 30. The detection part 34 is configured to detect AC power being supplied from the power feed control device A to the on-vehicle charger 31. The charge control device 35 is configured to control to turn on and off the relay 33 based on a detection result of the detection part 34. For details, when AC power is detected through the detection part 34, the charge control device 35 controls to turn on the relay 33 to charge the battery 30 through the on-vehicle charger 31. When AC power is not detected through the detection part 34, the charge control device 35 controls to turn off the relay 33 to stop charging the battery 30.

The power feed control device A includes a plug 20 as a power connector, a load connector 21 and a feed line. The feed line includes a first conductive wire L1 corresponding to a live wire and a second conductive wire L2 corresponding to a neutral wire. The power feed control device also includes a third conductive wire L3 corresponding to a ground wire. The plug 20 has a ground terminal, and is configured to be detachably attached to an outlet (not shown in figure) for supplying electric power from an external AC power supply such as the commercial power supply. The load connector 21 is configured to be detachably attached to the connector 32 of the electric vehicle B. Each of the first conductive wire L1 and the second conductive wire L2 is arranged between the plug 20 and the load connector 21. The third conductive wire L3 is arranged between the ground terminal of the plug 20 and the load connector 21. In addition, a fourth conductive wire (signal line) L4 corresponding to a signal wire is connected with the load connector 21. The fourth conductive wire L4 is arranged separately from the first conductive wire L1, the second conductive wire L2 and the third conductive wire L3. The fourth conductive wire L4 is configured to transmit a signal to and from the charge control device 35 of the electric vehicle B. A normally opened relay (switching device) 10 including a pair of contact mechanisms is inserted in the first and second conductive wires L1, L2. Each of the pair of contact mechanisms includes a contact point and a contact open/close part. The contact point rp1 and the corresponding open/close part rs1 are inserted in the feed wire L1. The contact point rp2 and the corresponding open/close part rs2 are inserted in the feed wire L2. The relay 10 is configured to make and break the connection between the power supply and the electric vehicle B. Each of the first and second conductive wires L1, L2 passes through a zero-phase-sequence current transformer ZCT between the relay 10 and the plug 20.

In addition, the power feed control device A includes a connection judging circuit 11, a control circuit 12, a leakage detection circuit 13, a voltage detection circuit 14 and a branch wire (branch line) L5. The connection judging circuit 11 is connected with each of the first and second conductive wires L1, L2 between the zero-phase-sequence current transformer ZCT and the plug 20. The connection judging circuit 11 is configured to detect a potential difference between the first conductive wire L1 and the second conductive wire L2. The control circuit 12 is configured to be connected with the electric vehicle B through the fourth conductive wire L4. The control circuit 12 is configured to control to turn on and off the relay 10 in response to a control signal supplied from the electric vehicle B through the fourth conductive wire L4. The control circuit 12 is configured to make and break the first conductive wire L1 and the second conductive wire L2 by controlling to turn on and off the contact mechanisms of the relay 10, respectively. The leakage detection circuit 13 is configured to be able to detect occurrence of electrical leakage by detecting an unbalanced current through the zero-phase-sequence current transformer ZCT. That is, the leakage detection circuit 13 is configured to, when a magnitude of the unbalanced current is larger than a predetermined value, decide that electrical leakage occurs. The control circuit 12 is configured to control to turn off the relay 10 when the occurrence of electrical leakage is detected through the leakage detection circuit 13. The voltage detection circuit 14 is connected with each of the first conductive wire L1 and the second conductive wire L2 between the relay 10 and the load connector 21. The voltage detection circuit 14 is configured to detect each voltage of the first conductive wire L1 and the second conductive wire L2 between the relay 10 and the load connector 21. The branch wire L5 is a conductive wire, and branches from the voltage detection circuit 14.

Figure 3A:
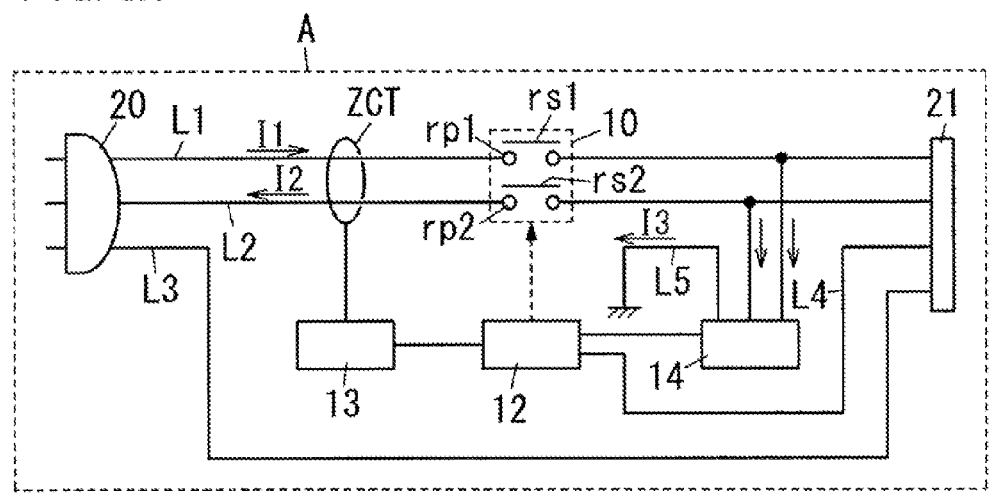
FIG. 3A is a circuit block diagram of a conventional example.
Figure 3B:
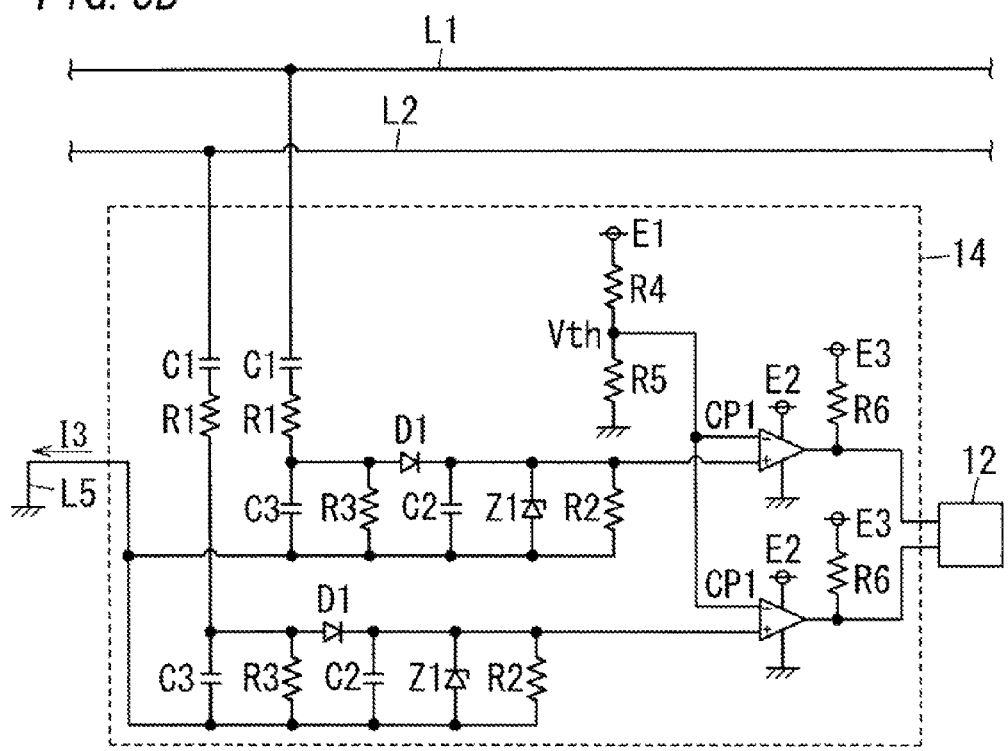
FIG. 3B is a circuit block diagram of a voltage detection circuit 14 of the conventional example.

The configuration of the voltage detection circuit 14 of this embodiment is the same with that of the conventional example shown in FIG. 3B. The voltage detection circuit 14 is configured to detect whether or not voltage is applied to each of the first conductive wire L1 and the second conductive wire L2. As shown in FIG. 3B, the voltage detection circuit 14 includes a condenser C1, a resistor R1, a diode D1, a condenser C2, a zener diode Z1, a resistor R2 and a comparator CP1. The comparator CP1 of the voltage detection circuit 14 is configured to compare the threshold voltage $V_{th}$ with the voltage of the first conductive wire L1 (or the second conductive wire L2) after being smoothed by a condenser C1 and a resistor R1, and being peak held by a diode D1, a condenser C2, a zener diode Z1 and a resistor R2. If each of the contact mechanisms of the relay 10 is not welded, when the control circuit 12 controls to turn off the relay 10, the contact open/close part rs1 separates from the contact point rp1, and the contact open/close part rs2 separates from the contact point rp2. Then, each of the first conductive wire L1 and the second conductive wire L2 is to break. In this case, the voltage detection circuit 14 does not detect voltage. On the other hand, if the contact point rp1 and the contact open/close part rs1 are welded, or if the contact point rp2 and the contact open/close part rs2 are welded, even if the control circuit 12 controls to turn off the relay 10, a welded contact open/close part rs1 or rs2 cannot separate from the corresponding contact point rp1 or rp2. In this case, current flows from the power supply to ground through the welded contact open/close part rs1 or rs2 and through the branch wire L5. Therefore, the voltage detection circuit 14 is to detect voltage. If detecting the above contradiction, that is, if voltage is detected through the voltage detection circuit 14 when the relay 10 is controlled to turn off, the control circuit 12 decides that a contact mechanism of the relay 10 is welded.

The branch wire L5 of this embodiment branches from the voltage detection circuit 14, and is inserted in the zero-phase-sequence current transformer ZCT in the direction from the load connector 21 side to the plug 20 side, and one end is connected with the third conductive wire L3 at the plug 20 side. Here, the third conductive wire L3 corresponds to a ground wire. That is, the branch wire L5 is inserted in the zero-phase-sequence current transformer ZCT in the direction that the one end connected with the third conductive wire L3 is positioned at the power supply side and the other end as a branch point from the voltage detection circuit 14 is positioned at electric vehicle B side. The current I3 flows, in the branch wire L5 which is inserted in the zero-phase-sequence current transformer ZCT, in the same direction with the current I2 (that is, in the direction from right to left in FIG. 1). Here, the current I2 is a current flowing in the first conductive wire L1 or the second conductive wire L2 from the electric vehicle B to the power supply. If unbalance occurs in sum of currents flowing in the first conductive wire L1, the second conductive wire L2 and the branch wire L5, the zero-phase-sequence current transformer ZCT generates an induced current according to the unbalanced current. The leakage detection circuit 13 is configured to detect occurrence of electrical leakage based on the induced current. That is, the leakage detection circuit 13 is configured to detect occurrence of electrical leakage based on the unbalanced current flowing through the zero-phase-sequence current transformer ZCT.

Also, the power feed control device A includes a power supply circuit (not shown in figure). The power supply circuit is connected with each of the first conductive wire L1 and the second conductive wire L2 between the relay 10 and the plug 20, and connected with the third conductive wire L3. The power supply circuit is configured to generate electric power for operating each circuits of the power feed control device A.

Next, an operation of this embodiment is explained.

Figure 2:
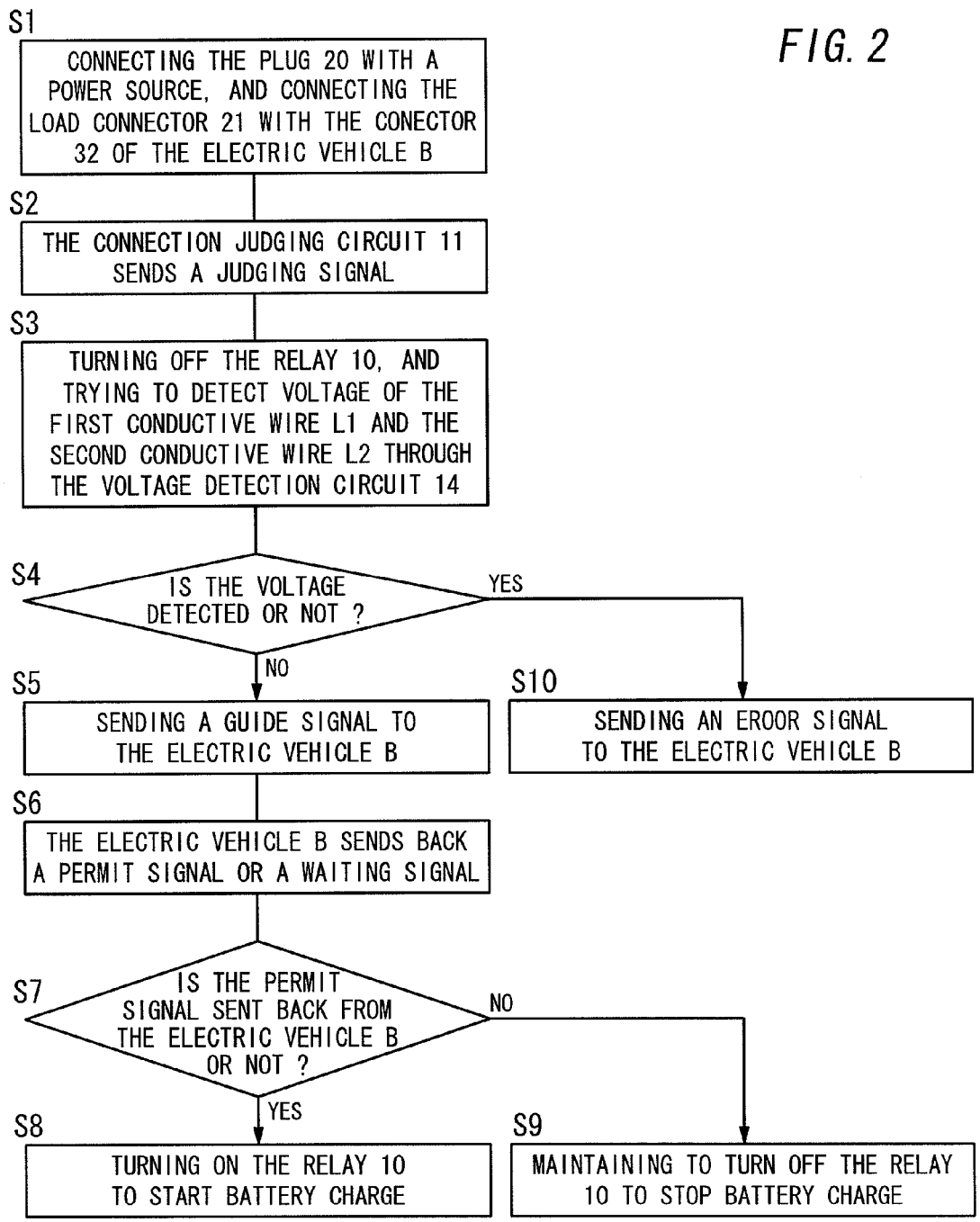
FIG. 2 is a flow chart for explaining the operation of said embodiment.

An operation of the power feed control device A when starting to charge the battery 30 of the electric vehicle B is explained with reference to FIG. 2.

When connecting the plug 20 with the power supply, and connecting the load connector 21 with the connector 32 of the electric vehicle B (S1), a potential difference between the first conductive wire L1 and the second conductive wire L2 generates at a part of the feed line (the first and second conductive wires L1, L2) between the plug 20 and the relay 10. If the connection judging circuit 11 detects the potential difference for a predetermined time, the connection judging circuit 11 decides that the plug 20 is connected with the power supply, and to supply the control circuit 12 with a judging signal (S2). During the plug 20 is connected with the power supply, this judging signal is always supplied. When receiving the judging signal from the connection judging circuit 11, the control circuit 12 first controls to turn off the relay 10. After the elapse of a predetermined stable time of circuits (that is, an enough time for a circuit to be discharged after flowing a current, for example 75 ms), the control circuit 12 tries to detect voltage of each of the first and second conductive wires L1, L2 between the load connector 21 and the relay 10 through the voltage detection circuit 14 (S3). If voltage is not detected through the voltage detection circuit 14 when the relay 10 is controlled to turn off (S4), the control circuit 12 decides that the relay 10 is operating properly (that is, the contact mechanisms of the relay 10 are not welded), and to send a guiding signal (for example, voltage of 12V) to the electric vehicle B through the fourth conductive wire L4 (S5). When receiving the guiding signal, if the electric vehicle B is in a chargeable condition, the charge control device 35 of the electric vehicle B sends back a permit signal for permitting battery charge (for example, voltage of 6V) to the control circuit 12 through the fourth conductive wire L4. On the other hand, if the electric vehicle B is not in a chargeable condition, such as in a condition that the battery 30 is fully charged, the charge control device 35 sends back a waiting signal for not permitting battery charge (for example, voltage of 9V) to the control circuit 12 through the fourth conductive wire L4 (S6). It should be noted that if the load connector 21 is not connected with the connector 32 of the electric vehicle B, the guiding signal sent by the control circuit 12 just returns to the control circuit 12 with no change (for example, with the voltage of 12V). Therefore, the control circuit 12 can detect such a condition that the load connector 21 is not connected. That is, the control circuit 12 can detect that whether or not the load connector 21 is connected with the connector 32. When receiving the permit signal from the electric vehicle B (S7), the control circuit 12 controls to turn on the relay 10 to start supplying the electric vehicle B with electric power. And the control circuit 12 supplies a display panel (not shown in figure) with a signal for informing that the battery is during charge. The display panel shows a charging sign in response to this signal (S8). On the other hand, when receiving the waiting signal from the electric vehicle B or when receiving the returned guiding signal (S7), the control circuit 12 stops charging by maintaining to turn off the relay 10. And the control circuit 12 supplies the display panel with a signal for informing that the battery charge has stopped. The display panel shows a stop charging sign in response to this signal (S9).

If voltage is detected through the voltage detection circuit 14 when the relay 10 is controlled to turn off (S4), the control circuit 12 decides that a contact mechanism of the relay 10 is welded. And the control circuit 12 sends an error signal (for example, voltage of −12V) to the electric vehicle B through the fourth conductive wire L4. And the control circuit 12 supplies the display panel with a signal for informing an error condition. The display panel shows an error sign in response to this signal (S10).

When the battery 30 of the electric vehicle B is being charged, the charge control device 35 of the electric vehicle B always sends the permit signal to the control circuit 12, the control circuit 12 always controls to turn on the relay 10, and the display panel always shows the charging sign. In addition, during the charge of the battery 30, the leakage detection circuit 13 always tries to detect occurrence of electrical leakage through the zero-phase-sequence current transformer ZCT. That is, the leakage detection circuit 13 compares the current I1 with sum of current I2 and current I3. Here, the current I1 is a current flowing in the first conductive wire L1 or the second conductive wire L2 from the power supply to the electric vehicle B. The current I2 is a current flowing in the first conductive wire L1 or the second conductive wire L2 from the electric vehicle B to the power supply. The current I3 is a current flowing in the branch wire L5 in the direction from the electric vehicle B side to the power supply side. If electrical leakage occurs in the electric vehicle B or in the power feed control device A, current unbalance generates between the current I1 and the sum of the current I2 and the current I3. The leakage detection circuit 13 is configured to detect this unbalanced current. If the magnitude of the unbalanced current detected through the zero-phase-sequence current transformer ZCT is larger than a predetermined value, the leakage detection circuit 13 decides that an electrical leakage occurs. When the occurrence of electrical leakage is detected through the leakage detection circuit 13, the control circuit 12 controls to turn off the relay 10, sends an error signal (for example, voltage of −12V) to the electric vehicle B through the fourth conductive wire L4, and supplies the display panel with the signal for informing an error condition. For above configuration, troubles such as electric shock can be prevented. Here, the detection circuit 13 may be configured to cause the relay 10 to turn off through the control circuit 12 when detecting the occurrence of electrical leakage.

When the charging of the battery 30 has completed, the charge control device 35 of the electric vehicle B sends the waiting signal to the control circuit 12. When receiving the waiting signal, the control circuit 12 controls to turn off the relay 10. And then, the control circuit 12 detects whether a contact mechanism of the relay 10 is welded or not by trying to detect voltage of each of the first and second conductive wires L1, L2 through the voltage detection circuit 14. In addition, the control circuit 12 supplies the display panel with a signal for informing that the battery charge has completed. The display panel shows a charge completion sign in response to this signal.

The power feed control device A of this embodiment charges the battery 30 of the electric vehicle B in the above described way.

According to the power feed control device A of this embodiment, the branch wire L5 is inserted in the zero-phase-sequence current transformer ZCT in the direction from the electric vehicle B side to the power supply side, and connected with the third conductive wire L3 at the power supply side. That is, the branch wire L5 is inserted in the zero-phase-sequence current transformer ZCT in the direction that the grounded one end is positioned at the power supply side and a branch point from the voltage detection circuit 14 is positioned at the electric vehicle B side. For this reason, the zero-phase-sequence current transformer detects a current unbalance between the current flowing from the electric vehicle B side to the power supply side (sum of the current I2 and the current I3) and the current I1 flowing from the power supply side to the electric vehicle B side. Therefore, the present invention can prevent such a problem as the conventional example that an unbalanced current, whose magnitude corresponds to the current I3 flowing in the branch wire L5, is always detected. The leakage detecting circuit 13 of the present invention can detect a small, amount of electrical leakage. Therefore, the present invention can prevent troubles such as electric shock.

Although the present invention has been described with reference to certain preferred embodiment, numerous modifications and variations can be made by those skilled in the art without departing from the true spirit and scope of this invention, namely claims.

The invention claimed is:

1. A power feed control device comprising:
   a feed line connected between an external power supply and a load;
   a switching device inserted in the feed line, said switching device being configured to make and break the feed line;
   a zero-phase-sequence current transformer through which the feed line is passed, said zero-phase-sequence current transformer being configured to detect an unbalanced current in the feed line; and
   a voltage detection circuit connected with the feed line between the load and a combination of the switching device and the zero-phase-sequence current transformer, said voltage detection circuit being configured to detect voltage of the feed line,
   wherein a branch line from the voltage detection circuit is inserted in the zero-phase-sequence current transformer in the direction from the load side to the external power supply side.

2. A power feed control device as set forth in claim 1,
   wherein the feed line is configured to be used for charging a battery using the external power supply, said battery being mounted on a vehicle as the load,
   wherein the power feed control device further comprises:
   a control circuit electrically connected with a signal line for transmitting a control signal supplied from the vehicle, said control circuit being configured to control to turn on and off the switching device based on the control signal; and
   a leakage detection circuit configured to detect electrical leakage based on an unbalanced current detected through the zero-phase-sequence current transformer, said leakage detection circuit being configured to control the switching device to break the feed line when the electrical leakage is detected,
   wherein one end of the branch line is grounded,
   wherein the voltage detection circuit is configured to detect the voltage of the feed line between the switching device and the vehicle based on a current flowing in the voltage detection circuit,
   wherein the control circuit is configured, when detecting a contradiction between a detection result of the voltage detection circuit and a control condition of the switching device, to decide that a contact welding occurs,
   wherein the branch line passes through the zero-phase-sequence current transformer in the direction so that current flows in it in the same direction as the current flowing in the feed line from the vehicle to the external power supply.

3. A power feed control device as set forth in claim 1 or claim 2, further comprising:

a power connector comprising a ground terminal, said power connector being configured to be detachably attached to the external power supply; and a load connector configured to be detachably attached to a connector which the load is equipped with, wherein said feed line comprises first and second conductive wires arranged between the power connector and the load connector, said first and second conductive wires being configured to be connected with a live wire and a neutral wire of the external power supply when the power connector is connected with the external power supply, respectively, wherein the power feed control device further comprises a third conductive wire arranged between the ground terminal of the power connector and the load connector, said third conductive wire being configured to be connected with a ground wire of the external power supply when the power connector is connected with the external power supply, wherein the branch line is connected with the third conductive wire.

4. A power feed control device as set forth in claim 1, further comprising a leakage detection circuit connected with the zero-phase-sequence current transformer, said leakage detection circuit being configured to decide that electrical leakage occurs when the magnitude of the unbalanced current is larger than a predetermined value.

5. A power feed control device as set forth in claim 4, further comprising a control circuit connected with the switching device and the leakage detection circuit, said control circuit being configured to control the switching device to make and break the feed line, wherein the control circuit is configured to control the switching device to break the feed line when the occurrence of electrical leakage is detected through the leakage detection circuit.

6. A power feed control device as set forth in claim 5, further comprising a fourth conductive wire connected with the control circuit, said forth conductive wire being configured to be connected with a signal wire which the load is equipped with, wherein the control circuit is configured to send an error signal to the load through the fourth conductive wire when the occurrence of electrical leakage is detected through the leakage detection circuit.

7. A power feed control device as set forth in claim 1, further comprising:

a control circuit connected with the switching device and the voltage detection circuit, said control circuit being configured to control the switching device to make and break the feed line; and a fourth conductive wire connected with the control circuit, said forth conductive wire being configured to be connected with a signal wire which the load is equipped with, wherein the control circuit is configured to send an error signal to the load through the fourth conductive wire if the voltage is detected through the voltage detection circuit when the control circuit tries to control the switching device to break the feed line.

8. A power feed control device as set forth in claim 2, further comprising:

a power connector comprising a ground terminal, said power connector being configured to be detachably attached to the external power supply; and a load connector configured to be detachably attached to a connector which the load is equipped with, wherein said feed line comprises first and second conductive wires arranged between the power connector and the load connector, said first and second conductive wires being configured to be connected with a live wire and a neutral wire of the external power supply when the power connector is connected with the external power supply, respectively, wherein the power feed control device further comprises a third conductive wire arranged between the ground terminal of the power connector and the load connector, said third conductive wire being configured to be connected with a ground wire of the external power supply when the power connector is connected with the external power supply, wherein the branch line is connected with the third conductive wire.

* * * * *